United States Patent
Birns et al.

(10) Patent No.: US 6,188,256 B1
(45) Date of Patent: Feb. 13, 2001

(54) RESET-OUT CIRCUIT WITH FEED BACK CAPABILITY

(75) Inventors: Neil Edward Birns, Cupertino; Jie Zheng, Mountain View; William Jay Slivkoff, San Jose, all of CA (US)

(73) Assignee: Philips Electronics North America Corporation, New York, NY (US)

(*) Notice: Under 35 U.S.C. 154(b), the term of this patent shall be extended for 0 days.

(21) Appl. No.: 09/206,435

(22) Filed: Dec. 7, 1998

(51) Int. Cl.$^7$ .................................................. H03L 7/00
(52) U.S. Cl. .......................... 327/142; 327/143; 327/160; 377/2; 377/16
(58) Field of Search .................................. 327/142, 143, 327/160; 377/2, 16

(56) References Cited

U.S. PATENT DOCUMENTS

| | | | |
|---|---|---|---|
| 4,665,536 | * | 5/1987 | Kim ......................................... 377/16 |
| 5,228,066 | * | 7/1993 | DeVane ................................... 377/20 |
| 5,521,848 | * | 5/1996 | Bayne et al. ............................ 377/16 |

FOREIGN PATENT DOCUMENTS

| | | | |
|---|---|---|---|
| 0679981A2 | 11/1995 | (EP) | ................................. G06F/1/24 |
| WO9724652 | 7/1997 | (WO) | ................................. G06F/1/24 |

OTHER PUBLICATIONS

By Motorola, "Intializating Micro–Computer Peripherals" Technical Developments, Motorola Inc. Oct. 1985, vol. 5, pp. 41–43.

* cited by examiner

*Primary Examiner*—Margaret R. Wambach
(74) *Attorney, Agent, or Firm*—Tony E. Piotrowski

(57) ABSTRACT

A reset device is disclosed which is part of a micro-controller formed on an integrated circuit. The reset device has a counter which outputs a count enable signal after counting a predetermined number of counts. In response to an input reset signal, an input device of the reset device provides a start signal to the counter for initiating count-down thereof. An output device outputs an output reset signal in response to the start signal and the count enable signal. The start signal is inhibited by a control signal, which is provided from a control device in response to an external reset signal received at an input pin of the micro-controller. The input device includes an AND gate which receives the input reset signal, an inverted delayed version of the input reset signal, and the disable signal. The reset device further includes an OR gate which receives the start signal and the count enable signal to provide an input signal to the output device for generation of the output reset signal. Another OR gate receives the outputs the counter and provides the count enable signal.

20 Claims, 3 Drawing Sheets

RESET-OUT CIRCUIT WITH FEED BACK CAPABILITY

BACKGROUND OF THE INVENTION

1. Field of the Invention

The present invention relates to a reset-out circuit, and more particularly, to a micro-controller with a reset-out circuit that allows feeding back the micro-controller reset-out signal to its reset-in input without locking the micro-controller into reset.

2. Discussion of the Prior Art

Micro-controllers typically have a reset state where various circuits of the micro-controllers are initialized prior to commencement of normal operation. For example, the reset state is entered when power is first applied or when certain internal or external conditions occur that cast doubt on continued proper operation of the micro-controllers. Entering the reset state initializes the micro-controller to a known state and allows proper operation thereafter.

A typical micro-controller has a reset-in input pin which receives an external reset signal to reset the micro-controller, e.g., due to a power interrupt. In addition to being reset by the external reset signal, the micro-controller is also reset due to internal conditions. The micro-controller outputs a reset-out signal from a reset-out output pin in response to either the external reset signal received at the reset-in input pin, or an internally generated reset signal. For example, the internal reset signal is generated by a central processing unit (CPU) of the micro-controller in response to execution of a reset instruction, by a timeout of a watchdog timer or by detection of certain error conditions.

It is desirable to use the micro-controller reset-out signal as a single global reset signal provided to all circuits of a device, since the micro-controller reset-out signal is generated in response to either the external or internal reset conditions. When used as a global reset, the micro-controller reset-out signal from the reset-out output pin is fed back to the reset-in input pin of the micro-controller, as well as to other devices in the system.

Feeding back the micro-controller reset-out signal to the micro-controller reset-in input pin presents the potential problem of locking the micro-controller into the reset state permanently. A further problem arises due to the short duration or pulse width of the global system reset signal provided from the micro-controller. A short global system reset signal may not properly reset all devices in a system.

Accordingly, there is a need for a circuit that allows proper operation of a micro-controller in response to both externally and internally generated reset signals where a global system reset output from the micro-controller reset-out output pin is fed back to the micro-controller reset-in input pin without locking the micro-controller in the reset state and causing other problems.

SUMMARY OF THE INVENTION

The object of the present invention is to provide a reset device in a micro-controller, for example, which overcomes the problems of conventional reset devices.

Another object of the present invention is to provide a reset device which distinguishes between an externally-supplied reset and an internally generated one.

A further object of the present invention is to provide a reset device which provides a reset-out pulse of sufficient duration whenever an internally-generated reset is detected.

A still further object of the present invention is to provide a reset device which permits the reset-out pulse from the micro-controller reset-out output pin to be fed-back into the micro-controller reset-in input pin without causing the micro-controller to permanently latch-up.

A yet further object of the present invention is to provide a reset device which permits the user to disable the entire reset-out function of the micro-controller under software control.

Another object of the present invention is to provide a reset device that accomplishes all of the above objects without initializing any of the flip-flops involved during reset or following power-up.

The present invention accomplishes the above and other objects by providing a reset device in a micro-controller, for example. The reset device has a counter which outputs a count enable signal after counting down a predetermined number of counts, for example. An input device of the reset device provides a start signal to the counter for initiating the count-down in response to an input reset signal. An output device outputs an output reset signal in response to the start signal and the count enable signal. The start signal is inhibited by a control signal, which is provided from a control device in response to an external reset signal received at an input pin of the micro-controller.

The input device includes an AND gate which receives the input reset signal. The AND gate also receives an inverted delayed version of the input reset signal and the control signal. The reset device further includes a NOR gate which receives the start signal and the count enable signal to provide the output reset signal. An OR gate receives the outputs from the counter and provides the count enable signal.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
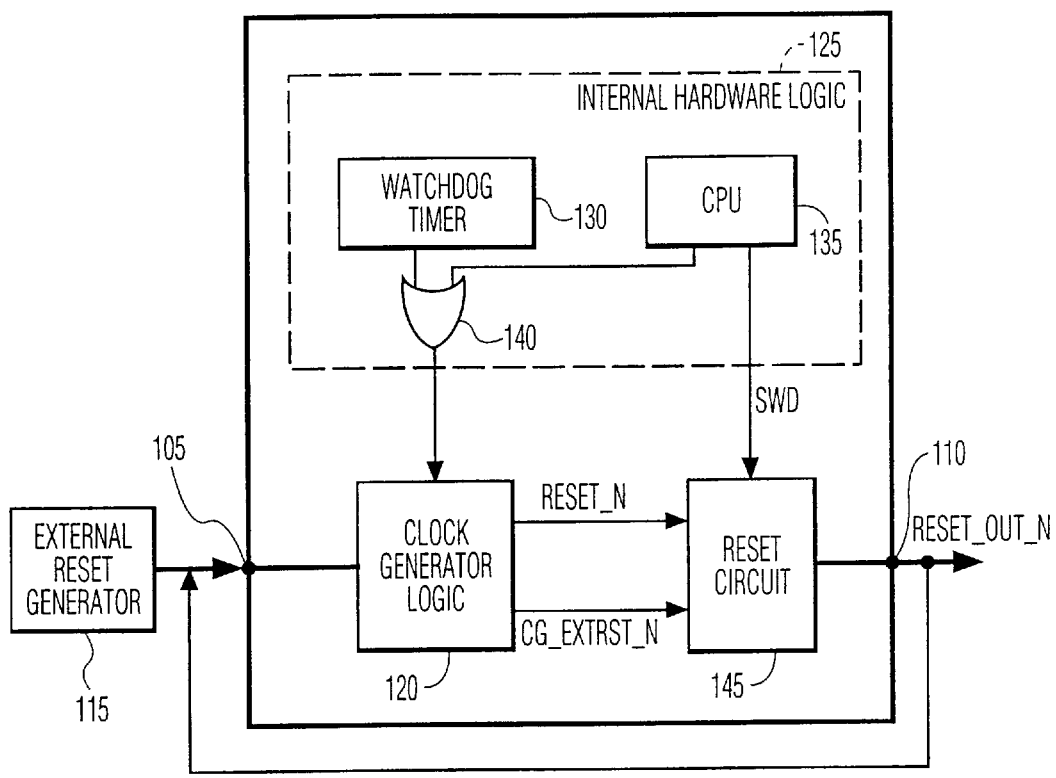
FIG. 1 shows a micro-controller according to the present invention.

FIG. 1 shows a micro-controller 100 having a reset-in input pin 105 and a reset-out output pin 110. A global reset signal is received at the reset-in input pin 105. The global reset signal is provided from either an external reset generator 115 or the micro-controller reset-out output pin 110 which is connected back to the reset-in input pin 105. For simplicity, the signal received at the micro-controller reset-in input pin 105 is hereinafter referred to as the external reset signal. The external reset signal is provided to a clock generator logic 120 of the micro-controller 100.

In addition to the global or external reset signal received at the micro-controller reset-in input pin 105, the clock generator logic 120 also receives an internal reset request signal from an internal hardware logic 125 of the micro-controller 100. Illustratively, the internal hardware logic 125 monitors hardware conditions, such as power or battery level, and generates the internal reset request signal in response to a low power condition or oscillator failure, for example.

In the illustrative embodiment shown in FIG. 1, the internal reset request signal is generated in response to the time-out of a watchdog timer 130 or a reset instruction from a CPU 135. The time-out and CPU command signals are provided to an OR gate 140 which outputs the internal reset request signal to the clock generator logic 120.

In response to either the internal reset request signal from the internal hardware logic 125 or the external reset signal received at the micro-controller reset-in input pin 105, the clock generator logic 120 outputs a RESET_N signal to a reset circuit 145. In addition to the RESET_N signal, the clock generator logic 120 also outputs an inhibit signal CG_EXTRST_N to the reset circuit 145 when an external reset signal is received at the micro-controller reset-in input pin 105. Thus, the inhibit signal CG_EXTRST_N indicates that the reset signal received by the clock generator logic 120 is an external reset from the micro-controller reset-in input pin 105, rather than an internal reset request signal from the internal hardware logic 125, and disables operation of the reset circuit 145.

The reset circuit 145 is also connected to the CPU 135 to receive a software write data (SWD) signal which enables operation of the reset circuit 145 after its operation has been disabled by the inhibit signal CG_EXTRST_N. Thus, in response to the external reset signal, the clock generator logic 120 outputs both the RESET_N signal and the inhibit signal CG_EXTRST_N. By contrast, the clock generator logic 120 outputs only the RESET_N signal in response to the internal reset signal. Illustratively, the inhibit signal CG_EXTRST_N has a logic high value when an external reset is received by the clock generator logic 120, and has a logic low value when an internal reset request signal is received. As will be described, the micro-controller RESET_OUT_N signal from the reset-out output pin 110 is inhibited by the inhibit signal CG_EXTRST_N from the clock generator logic 120 to the reset circuit 130.

In response to the RESET_N signal and the absence of the inhibit signal CG_EXTRST_N, e.g., logic low, the reset circuit 145 outputs the RESET_OUT_N signal from the reset-out pin 110 of the micro-controller 100. The RESET_OUT_N signal is a global reset which resets all circuits of the device which includes the micro-controller 100, such as any device requiring control, including consumer electronics, communication, computer and automation equipment, as well as medical and industrial equipment.

The RESET_OUT_N signal is also fed back to the reset-in input pin 105 of the micro-controller 100. In the absence of the reset circuit 145, the micro-controller locks into the reset state since feeding the RESET_OUT_N signal from the micro-controller reset-out output pin 110 to the reset-in input pin 105 would generate a second RESET_OUT_N signal which is in turn fed back to the reset-in input pin 105 to again generate a third RESET_OUT_N signal. This RESET_OUT_N signal generation continues and permanently latches the micro-controller 100 in the reset state. The reset circuit 145 prevents lock-up of the micro-controller 100 in the reset state.

Figure 2:
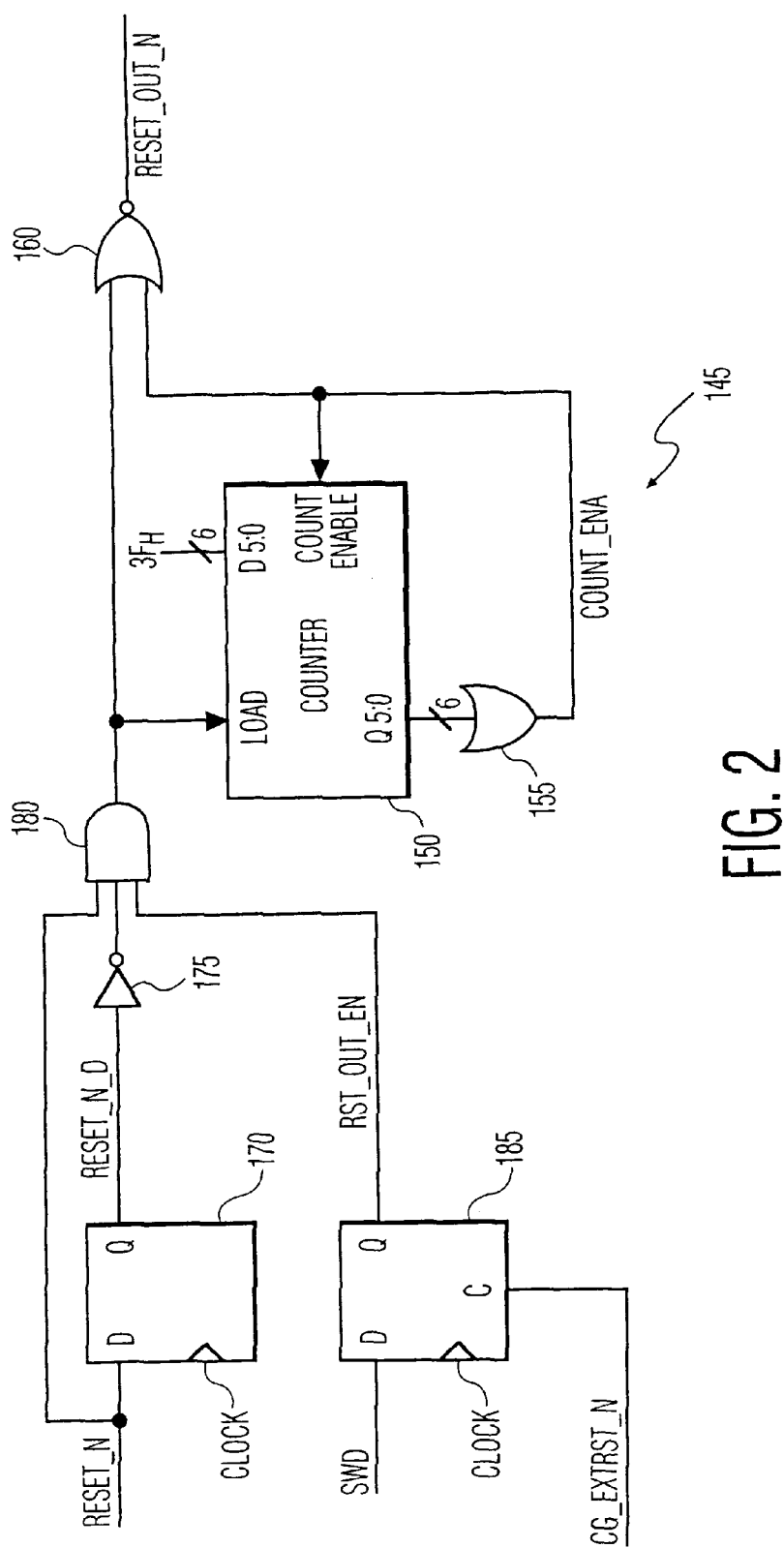
FIG. 2 shows a reset device according to the present invention.

FIG. 2 shows the reset circuit 145 in greater detail. As shown in FIG. 2, the reset circuit or device 145 has a counter 150 which is an n-bit down counter where n=6 for example. The 6-bit down counter 150 has six inputs and six outputs. The six outputs are provided to an OR gate 155 which outputs a count enable (COUNT_ENA) signal, also referred to as a zero-n signal. The COUNT_ENA signal goes low whenever the counter 150 counts down to zero and is provided to the enable input of the counter 150 as well as a NOR gate 160. The duration of the COUNT-ENA signal, which is also related to the duration of the RESET_OUT_N signal from the reset output pin 110 of the micro-controller 100, is dependent on the value pre-loaded in the counter 150. Thus, this duration is easily changed by pre-loading different values in the counter 150 in order to achieve a desired duration of the RESET_OUT_N signal for properly resetting all devices in the system.

In addition to the COUNT_ENA signal, the NOR gate 160 also receives a START signal as a second input. The output of the NOR gate 160 is the global reset or RESET_OUT_N signal, also shown in FIG. 1 from the reset-out output pin 110. If needed, drivers or delay elements, such as a flip-flip, may be connected to the output of the NOR gate 160 to provide a delay or an additional drive to the RESET_OUT_N signal.

The START signal is provided to the NOR gate 160 from an input device. In particular, the input device includes an input flip-flop 170, such as a D flip-flop, which receives the RESET_N signal from the clock generator 120 shown in FIG. 1. The input flip-flop 170 delays its input RESET_N signal and outputs a delayed reset signal RESET_N_D which is inverted by an inverter 175. The input and output signals of the input flip-flop 170, namely, the RESET_N and inverted delayed RESET_N_D signals, are provided to an AND gate 180 in order to provide the START signal to the counter 150 and the NOR gate 160.

The AND gate 180 has another input to receive a control signal which enables or disables the AND gate 180 depending on the control signal level. This additional signal is referred to as a reset-out enable signal RST_OUT_EN, and is provided from an enable/disable device also referred to as a control device. Illustratively, the control device is a flip-flop 185, such as a D flip-flop with a clear input C. The D-input of the control flip-flop 185 receives the software write data (SWD) signal from the CPU 135 shown in FIG. 1, and the flip-flop clear input C receives the inhibit signal CG_EXTRST_N which indicates receipt of an external reset signal. The SWD signal enables the control flip-flop 185 to provide a high output, namely, a logic high RST_OUT_EN signal to the AND gate 180, whereas the inhibit signal CG_EXTRST_N disables the control flip-flop 185 to provide a low RST_OUT_EN signal.

The CG_EXTRST_N signal is a signal which mirrors the RESET_N signal provided to the input flip-flop 170. Thus, the CG_EXTRST_N signal has the same duration and occurs coincidentally with the RESET_N signal. However, unlike the RESET_N signal which is provided by the clock generator logic 120, shown in FIG. 1, in response to a reset from any source, whether external or internal to the micro-controller 100, the CG_EXTRST_N signal only occurs, e.g., has a logic high level, when the source of the reset is external to the micro-controller 100, i.e., received at the micro-controller reset-in input pin 105. The CG_EXTRST_N is provided only when the reset input to the clock generator 120 is caused by an external reset from pin 105 using circuits which are well known in the art.

Figure 3:
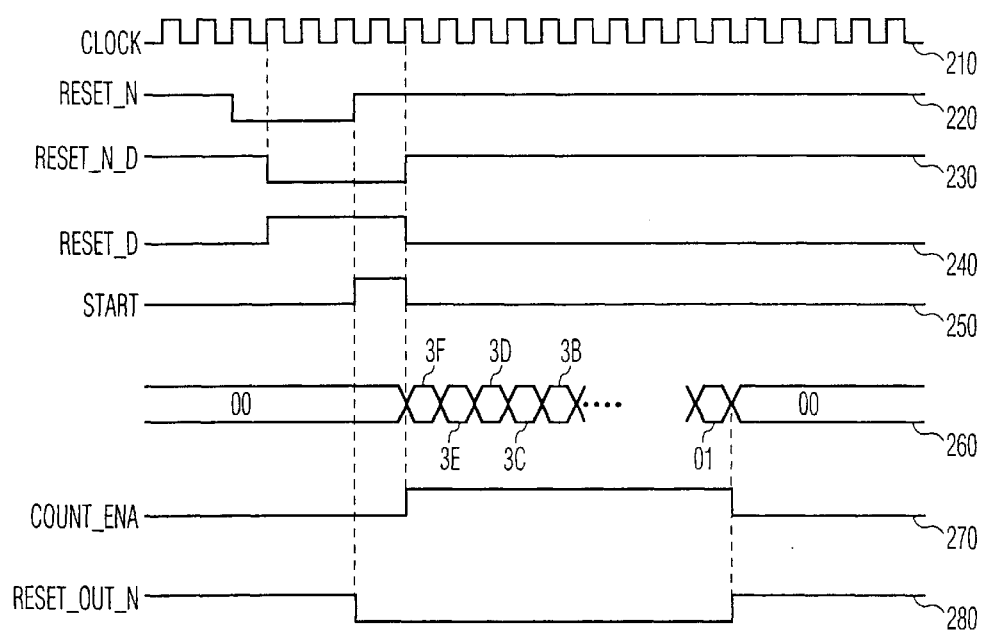
FIG. 3 shows a timing diagram of signals of the reset device according to the present invention.

The operation of the reset device 130 is now explained by reference to FIGS. 2–3, where FIG. 3 is a timing diagram 200 of various signals of the reset device 130. In particular, FIG. 3 shows a clock signal 210 which is provided to the clock inputs of the two flip-flops 170, 185. The RESET_N signal 220, which is provided to the input flip-flop 170, is a low-going pulse which occurs during any reset, i.e., internally generated by the internal hardware logic 125 of the micro-controller 100 (FIG. 1) or externally applied to the reset-in input pin 105 of the micro-controller 100. The RESET_N signal 220 is the signal which actually accomplishes the resetting of all of the logic throughout the micro-controller 100.

FIG. 3 also shows the output of the input flip-flop 170, namely, the delayed reset signal RESET_N_D 230 which is the RESET_N signal 220 delayed by the input flip-flop 170. After being inverted by the inverter 175, the inverted delayed RESET_D 240 is ANDed with the RESET_N 220. This forms the START pulse 250, which is a one-clock wide pulse between the trailing or rising edge of the RESET_N signal 220 and the trailing or falling edge of the inverted delayed RESET_D signal 240. The START pulse 250 is used to pre-load the down counter 150 and to set output devices, such as an output flip-flop connected to the output of the output NOR gate 160.

In response to the START pulse 250, the counter 150 of the reset device 145 is loaded with a predetermined value. Illustratively, the counter 150 is pre-loaded with the value 3F in hexadecimal notation (H). The predetermined count value $3F_H$ 260 is loaded one clock following the end of an internally generated reset pulse, namely, one clock after the RESET_N signal 220, i.e., after the START signal 250. As will be described, if the reset input is an external one, then the AND gate 180 will be disabled and will not generate the START pulse; thus the counter 150 will not be loaded.

Following the pre-load, the counter 150 counts down to zero, then halts. The count period establishes the duration or pulse width of the COUNT_ENA signal 270 and thus the duration of the RESET_OUT_N signal 280, which is provided from the output NOR gate 160. This is achieved by providing the six outputs of the counter 150 to an OR gate 155, which outputs the zero-n or COUNT_ENA signal 270 signal, which is a logic low when all the six OR gate inputs are low.

The output NOR gate 160 or a flip-flop connected to the output of the NOR gate 160, for example, is initially set when the counter 150 is pre-loaded, i.e., when the START signal 250 goes high, and is cleared when the counter 150 reaches zero, i.e., when the COUNT_ENA signal 270 goes low. This can be seen from FIGS. 2–3, where providing the START signal 250 and the COUNT_ENA signal 270 to the NOR gate 160 results in the RESET_OUT_N pulse 280.

In particular, the rising edge of the START pulse 250 initiates loading of the counter 150 and count-down thereof. The COUNT_ENA signal 270 is high during the countdown 260 and low when the countdown ends and reaches zero. The output of the NOR gate 160, namely, the RESET_OUT_N pulse 280, is low whenever either one of its two inputs (i.e., the START and COUNT_ENA signals 250, 270) is high. Thus as shown in FIG. 3, the rising edge of the START pulse 250 causes the falling edge of the RESET_OUT_N signal 280 and the falling edge of the COUNT_ENA signal 270 causes the rising edge of the RESET_OUT_N signal 280.

The AND gate 180, which outputs the START pulse 250, is qualified by the enable signal RST_OUT_EN emanating from the control flip-flop 185. Illustratively, the control flip-flop 185 is software-writeable, special-function register flip-flop. The control flip-flop 185 is cleared to a logic 0 output, or the "disable" state, by the CG_EXTRST_N signal which is present whenever an externally applied reset occurs. Thus, the CG_EXTRST_N signal inhibits generation of the START signal 250.

This mechanism ensures that a START pulse 250 and, hence, the RESET_OUT_N pulse 280 will not occur in response to any external reset, including those cases where the external reset was generated by feeding a RESET_OUT_N pulse 280 from the reset-out output pin 110 of the micro-controller 100 back into its reset-in input pin 105 (FIG. 1). The reset device 145 distinguishes between an externally applied reset and an internally generated one, and is disabled in response to the external reset. Further, the reset device 145 permits the RESET_OUT_N signal from the micro-controller reset-out output pin 110 to be fed back into the micro-controller reset-in input pin 105 without causing the micro-controller 100 to permanently latch-up.

Following any external reset which disables the control flip-flop 185 and clears its output (i.e., RST_OUT_EN) to zero, the software sets or enables the enable special function register bit via a high level of the software write data (SWD) from the CPU 135 (FIG. 1) to the D input of the control flip-flop 185. This enables generation of the RESET_OUT_N signal by allowing generation of the START pulse 250 from the AND gate 180. Of course, applications which do not require enabling reset generation subsequent to an external reset can leave disabled the control flip-flop 185. Thus, this mechanism permits the user to not use the reset-out function if there is no need, by leaving disabled the entire reset-out function under software control, namely, by not enabling the control flip-flop 185 following its disablement by the CG_EXTRST_N inhibit signal.

The operation of the reset device 154 is next described after the very first external and internal reset conditions, where the first reset condition is typically an external reset condition. Upon initial power-up or the receipt of an initial external reset signal at the reset-in input pin 105 of the micro-controller 100, the control flip-flop 185 is disabled since CG_EXTRST_N is present to clear the enable/disable flip-flop output RST_OUT_EN to a low logic level. Thus, a START pulse is not generated from the one shot circuit comprising the input flip-flop 170, the inverter 175 and the AND gate 180. Consequently, the counter 150 is not loaded and does not count down, and no COUNT_ENA and RESET_OUT_N signals 270, 280 are generated. This begins normal operations.

Following the initial external reset signal, the software write data (SWD) from the CPU 135 enables the control flip-flop 185. Now, when an internal reset occurs and thus no CG_EXTRST_N is present, i.e., logic low, the START pulse 250 is generated to cause output of the RESET_OUT_N signal 280 from the reset-out output pin 110 of the micro-controller 100 to reset everything, i.e., a global reset, including resetting the micro-controller 100 itself. The micro-controller 100 is reset since the RESET_OUT_N signal 280 is fed back to the reset-in input pin 105 of the micro-controller 100. This fed back RESET_OUT_N signal 280 received at the controller reset-in input pin 105 will cause generation of the CG_EXTRST_N signal which inhibit output of another RESET_OUT_N signal 280 from the micro-controller reset-out output pin 110.

Thus, if the micro-controller reset-out output pin 110 is connected to the reset-in input pin 105, then the internal reset will reset the micro-controller 100 twice; once when the internal reset itself occurs and causes output of the RESET_OUT_N signal 280, and a second time when the RESET_OUT_N signal 280 is fed back to the micro-controller reset-in input pin 105. However, no particular harm is done, since circuitry external to the micro-controller are only reset once, namely, due to the generation of the RESET_OUT_N signal 280.

It is also noteworthy, that problems are not caused due to the counter 150 starting in a non-zero state after initial power-up. If upon power up, the counter 150 is in a counting state instead of a zero state, then a COUNT_ENA signal 270 is generated having a duration or pulse width which is shorter then the typical duration. Thus, the RESET_OUT_N signal 280 generated in this case also has a duration which is much shorter than the duration of the external reset caused by the power up. The short RESET_OUT_N signal 280 ends before the end of the initial power-up external reset. Accordingly, the short RESET_OUT_N signal 280 has no effect on proper operation of the devices controlled by the micro-controller 100 since the short RESET_OUT_N signal 280, which is generated due to a undesirable internal reset resulting from power-up, is masked by the external power-up reset received at the micro-controller reset-in input pin 105.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A reset device comprising:
   a counter which outputs an enable signal after counting a predetermined number of counts;
   an input device which provides a start signal to said counter for initiating said counting in response to an input reset signal;
   an output device which outputs an output reset signal in response to said start signal and said enable signal;
   said start signal being inhibited by a control signal.

2. The reset device of claim 1, further comprising a control device which provides said control signal to inhibit said start signal in response to a disable signal.

3. The reset device of claim 1, wherein said input device includes an AND gate which receives said input reset signal, a delayed response of said input reset signal, and said control signal.

4. The reset device of claim 1, wherein said input device includes a delay circuit which delays said input reset signal to provide a delayed input reset signal.

5. The reset device of claim 4, wherein said input device includes an AND gate which receives said input reset signal, an inverted version of said delayed input reset signal, and said control signal.

6. The reset device of claim 1, wherein said input device includes a flip-flop which receives said input reset signal; and an AND gate which receives said input reset signal, an inverted delayed output of said flip-flop, and said control signal.

7. The reset device of claim 1, wherein said output device includes a NOR gate which receives said start signal and said enable signal to provide said output reset signal.

8. A controller comprising:
   a counter which outputs an enable signal after counting a predetermined number of counts;
   an input device which provides a start signal to said counter for initiating said counting in response to a first input reset signal;
   an output device which outputs an output reset signal in response to said start signal and said enable signal;
   said start signal being inhibited by a control signal.

9. The controller of claim 8, wherein said first input reset signal is generated within said controller.

10. The controller of claim 8, further comprising a control device which provides said control signal to enable said start signal in absence of a second input reset signal received at an input pin of said controller.

11. The controller of claim 8, wherein said input device includes an AND gate which receives said first input reset signal, an inverted and delayed response of said first input reset signal, and said control signal.

12. The controller of claim 8, wherein said input device includes a delay circuit which delays said first input reset signal to provide a delayed input reset signal.

13. The controller of claim 12, wherein said input device includes an AND gate which receives said first input reset signal and an inverted version of said delayed input reset signal.

14. The controller of claim 8, wherein said input device includes a flip-flop which receives said first input reset signal; and an AND gate which receives said first input reset signal, an inverted delayed output of said flip-flop, and said control signal.

15. The reset device of claim 8, further comprising a NOR gate which receives said start signal and said enable signal to provide said output reset signal.

16. A controller comprising:
    a counter which outputs a count enable signal after counting a predetermined number of counts;
    an input device which provides a start signal to said counter for initiating said counting in response to an input reset signal;
    an output device which outputs an output reset signal in response to said start signal and said count enable signal;
    said start signal being disabled in response to an external reset signal received from devices which are external to said controller.

17. The controller of claim 16, wherein said input device includes an AND gate which receives said first input reset signal, an inverted and delayed response of said first input reset signal, and said external reset signal.

18. A controller comprising:
    an input device which provides a start signal in response to a first reset signal generated within said controller;
    a counter which outputs a count enable signal after counting a predetermined number of counts in response to said start signal;
    an output device which outputs an output reset signal in response to said start signal and said count enable signal;
    said start signal being disabled in response to a second reset signal received at an input pin of said controller.

19. A controller comprising:
    a clock generator which outputs a reset signal and a control signal in response to a reset request generated within said controller or a reset-in signal received at an input pin of said controller;
    a reset device which receives said reset signal and said control signal and outputs a reset-out signal from an output pin of said controller;;
    said control signal preventing output of said reset-out signal when said clock generator receives said reset-in signal.

20. The controller of claim 19, wherein said input pin is connected to said output pin.

* * * * *